United States Patent [19]

Shoji et al.

[11] Patent Number: 4,601,083
[45] Date of Patent: Jul. 22, 1986

[54] FISH PROCESSING APPARATUS

[75] Inventors: Toyoshige Shoji; Tatsuo Miyakawa, both of Kawasaki, Japan

[73] Assignee: Fujitsu Limited, Kawasaki, Japan

[21] Appl. No.: 564,712

[22] Filed: Dec. 23, 1983

[30] Foreign Application Priority Data

Dec. 28, 1982 [JP] Japan .................. 57-229480

[51] Int. Cl.[4] .......................................... A22C 25/14
[52] U.S. Cl. ............................................ 17/54; 17/63
[58] Field of Search .................... 17/63, 54, 53, 52

[56] References Cited

U.S. PATENT DOCUMENTS

| Re. 29,432 | 10/1977 | Leander et al. | |
| 3,800,363 | 4/1974 | Lapeyre | 17/54 X |
| 3,916,484 | 11/1975 | Kennedy | 17/52 |
| 4,025,988 | 5/1977 | Hartmann et al. | 17/54 X |
| 4,291,435 | 9/1981 | Hartmann | 17/54 X |
| 4,463,478 | 8/1984 | Hartmann et al. | 17/54 X |

FOREIGN PATENT DOCUMENTS

| 988666 | 5/1976 | Canada | 17/63 |
| 865525 | 2/1955 | Fed. Rep. of Germany | |
| 3111567 | 10/1982 | Fed. Rep. of Germany | |
| 1414404 | 9/1965 | France | |
| 2205275 | 5/1974 | France | |
| 0053994 | 6/1982 | France | |
| 2056116 | 3/1981 | United Kingdom | |
| 659124 | 4/1979 | U.S.S.R. | 17/63 |
| 921493 | 4/1982 | U.S.S.R. | 17/63 |

Primary Examiner—Willie G. Abercrombie
Attorney, Agent, or Firm—Staas & Halsey

[57] ABSTRACT

A fish processing apparatus including an image pick-up device for producing image information of a fish and a memory for storing the image information. A cutting position of head portion of the fish is determined in accordance with the image information. The relative position between the fish and a head cutter for cutting the head portion of the fish is adjusted in accordance with the determined cutting position.

16 Claims, 14 Drawing Figures

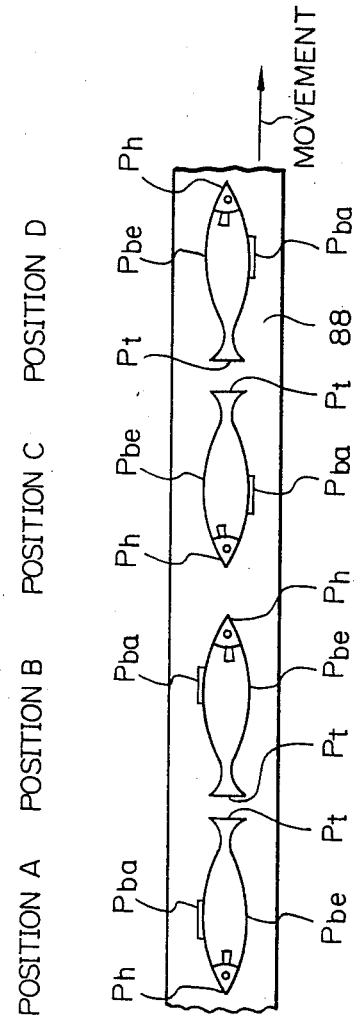

FISH PROCESSING APPARATUS

BACKGROUND OF THE INVENTION

1. Field of the Invention

The present invention relates to an apparatus for automatically processing fish to produce minced fish, particularly to a fish processing apparatus which can be disposed on a ship.

2. Description of the Prior Art

Fish processing apparatuses produce minced fish by first cutting off the fish heads, slicing the fish body to produce fillets, and then grinding the fillets.

In the prior art, fish heads are cut off at a cutting position a fixed distance from the front of the fish heads irrespective of the size of the fish. This would present no problem if the fish were of relatively uniform size. With larger fish, however, part of the head portion remains with the fish body after cutting. As a result, internal organs of the fish are mixed in the minced fish. This deteriorates the quality of minced fish. With smaller fish, part of the body of the fish is cut off and wastefully discarded.

On another matter, before cutting off the fish heads, it is necessary to arrange the fish in a predetermined position. In some fish processing apparatuses of the prior art, such positioning is carried out by hand. Aside from obstructing increased processing capacity, this allows for errors in positioning. If the fish is positioned with its tail forward instead of its head, the tail portion will be wasted and the head portion will remain with the body after cutting.

There are prior art positioning machines which can automatically position fish by back and belly portions, however, these machines cannot position fish by head and tail portions. Furthermore, since such machines judge the back and belly portions by mechanically detecting the difference of softness therebetween, they cannot correctly judge and arrange fish having different sizes.

SUMMARY OF THE INVENTION

It is, therefore, an object of the present invention to provide a fish processing apparatus which can cut off fish heads at an optimum cutting position irrespective of the size of the fish.

Another object of the present invention is to provide a fish processing apparatus which can correctly arrange fish in a predetermined position by both back and belly and head and tail portions.

A further object of the present invention is to provide a fish processing apparatus of small size and high speed operation.

The above objects are achieved by a fish processing apparatus comprising: means for producing image information of a fish; means for determining a cutting position of a head portion of the fish in accordance with the image information; and means for adjusting the relative position between the fish and a head cutter means for cutting the head portion of the fish in accordance with the image information of determining means.

The fish processing apparatus preferably further includes means for finding the position of the fish in accordance with the image information, and means for arranging the fish in a predetermined position depending upon the determined fish position before adjusting the relative position between the fish and the head cutter means.

According to the present invention, the image of a fish is detected and the relative position between the fish and a head cutter means is adjusted depending upon the detected image. Therefore, fish heads can be cut off at an optimum cutting position, even if the size of fish varies. Also, correct and high speed operation can be achieved.

Furthermore, since the position of the fish is found in accordance with the detected image and the fish position is arranged in a predetermined position depending upon the determined fish position, the apparatus according to the present invention can correctly arrange the fish position to a predetermined position. As a result, the quality of the produced minced fish can be improved without excessive cutting and waste of the fish body.

BRIEF DESCRIPTION OF THE DRAWINGS

FIG. 4 is a diagram illustrating fish position;

DESCRIPTION OF THE PREFERRED EMBODIMENT

Figure 1:
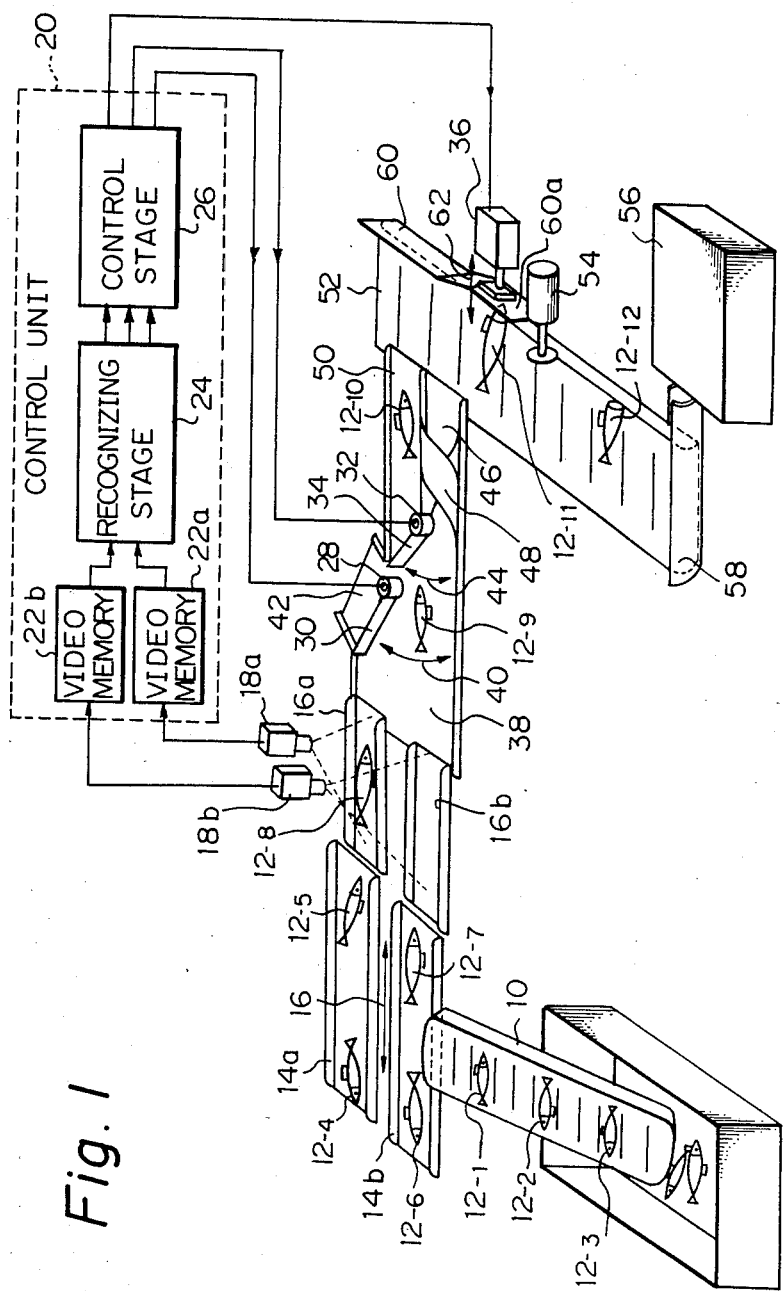
FIG. 1 is a schematic view of an embodiment of the present invention.

FIG. 1 illustrates an embodiment of a fish processing apparatus for producing fillets of, for example, pollack. In FIG. 1, reference numeral 10 denotes conveyor a hopper for feeding fish oscillation feeders 14a and 14b, as shown by points 12-1 to 12-3. The oscillation feeders 14a and 14b oscillate in the directions of an arrow 16. The oscillation of the feeders and scales of the fish cause fish at points 12-4 to 12-7 on the oscillation feeders 14a and 14b to move in their head directions.

The fish at points 12-5 and 12-7 on the oscillation feeders 14a and 14b are supplied to first conveyors 16a and 16b, respectively. The fish at points 12-4 and 12-6 are also supplied to first conveyors (not shown), which are positioned on the left side of the feeders 14a and 14b and have the same construction as the first conveyors 16a and 16b.

Image pick-up devices 18a and 18b, such as image tubes, are disposed above the first conveyors 16a and 16b, respectively. Light from light sources (not shown) is applied to the first conveyors 16a and 16b. The light reflected from the surface of fish on the first conveyors 16a and 16b is received by the image pick-up devices 18a and 18b. Each of the image pick-up devices 18a and 18b obtains image information of the fish by scanning an image of the fish formed on its image plane.

A control unit 20 is electrically connected to the image pick-up devices 18a and 18b. The control unit 20 includes video memories 22a and 22b, a recognizing stage 24, and a control stage 26. The image information from the image pick-up devices 18a and 18b is applied to and stored in the video memories 22a and 22b, respectively. The recognizing stage 24 connected to the video memories 22a and 22b recognizes the position of fish and length of the head portion of the fish based on the image information stored in the video memories 22a and 22b. In accordance with the recognized fish position and head length, drive signals are produced at the control stage 26.

An actuator 28 for driving a first selection gate 30, an actuator 32 for driving a second selection gate 34, and an actuator 36 for adjusting the cutting position of fish are electrically connected to the control unit 20. The actuators 28, 32 and 36 are operated in accordance with the drive signals from the control stage 26 in the control unit 20.

While scanning the image of a fish at point 12-8 on the first conveyor 16a and storing the image information in the video memory 22a, the image information which was obtained by scanning the image of a fish on the other first conveyor 16b and stored in the other video memory 22b is read out and fed to the recognizing stage 24. In this case, the fish corresponding to the image information read out from the video memory 22b is fed to a second conveyor 38, as shown by point numeral 12-9. The first conveyor 16b will be supplied with a new fish from the oscillation feeder 14b. Namely, fish on the first conveyor 16a and the first conveyor 16b are alternately scanned and recognized.

On the second conveyor 38, the first and second selection gates 30 and 34 are respectively provided. The first selection gate 30, driven by the actuator 28, swings in the directions shown by an arrow 40, in response to the drive signal feed from the control unit 20. If the first selection gate 30 is driven to hold at a position as shown in FIG. 1, the fish on the second conveyor 38 will be fed to the second selection gate 34. If the first selection gate 30 is driven to swing counterclockwise, however, the fish on the second conveyor 38 cannot be fed to the second selection gate 34 but will be ejected through an exit 42. For example, fish with the tail portion in the front and fish for which it is difficult to judge the difference between the back portion and the belly portion because of very poor difference in light density between them will be ejected from the exit 42. The ejected fish may be automatically returned to the hopper 11. The second selection gate 34 driven by the actuator 32 swings in the directions shown by an arrow 44, in response to the drive signal from the control unit 20. If the second selection gate 34 is driven to hold at a position as shown in FIG. 1, the fish on the second conveyor 38 will enter in a first branch passage 46 having a twisted guide 48 which inverts the back portion and belly portion of the fish. If the second selection gate 34 is driven to swing counterclockwise, the first branch passage 46 is closed and a second branch passage 50 is opened to pass the fish without changing the position. The fish at point 12-9 in FIG. 1, for example, which has the back portion downward and the belly portion upward, will be fed to the first branch passage 46 to invert the position. If the position of a fish is opposite from that of the fish at point 12-9, the second branch passage 50 will be opened and the fish will be fed therethrough, as shown at point 12-10.

A buffer conveyor 52 which receives fish from the first and second branch passages 46 and 50 feeds the fish to a head cutter 54 for cutting off the fish heads and supplies the bodies of the fishes, such as that at point 12-12, to a body processing machine 56 via a passage 58. The body processing machine 56 first produces fillets by cutting the body in slices and then produces minced fish. Along one side of the buffer conveyor 52, a guide board 60 is provided. Since the buffer conveyor 52 is tilted to the side of the guide board 60, the fronts of the heads of all the fish fed by the buffer conveyor 52 will be always kept in contact with the guide board 60. A part 60a of the guide board 60 is movable in the directions of arrows 62. The movable part 60a is coupled to the actuator 36, which includes a stepper motor or a servo motor driven by drive signals from the control unit 20. In response to the drive signal, the actuator 36 and the movable part 60a move in the directions of the arrow 62 so as to adjust the cutting position of the head portion of a fish at point 12-11. The optimum cutting position is determined by the control unit 20 depending upon the size of the fish at point 12-11. A detailed explanation of this control will be given later.

Optical sensors, although not shown, are preferably provided beside the first conveyors 16a and 16b and the buffer conveyor 52 so as to detect whether fish are on the first conveyors 16a and 16b and whether a fish is correctly fed to the buffer conveyor 52 during the process of recognition of the image of the fish. If the correct supply or feeding of fish is not executed, an operator will be given an alarm.

Figure 2:
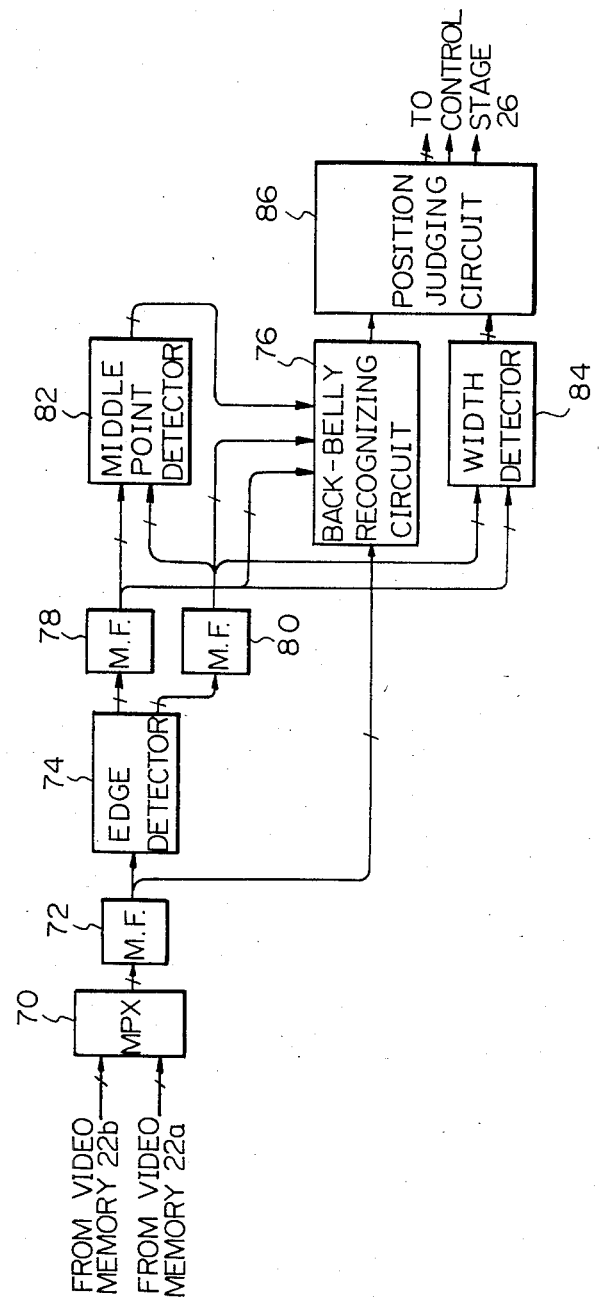
FIG. 2 is a block diagram of a recognizing stage in FIG. 1.
Figure 3:
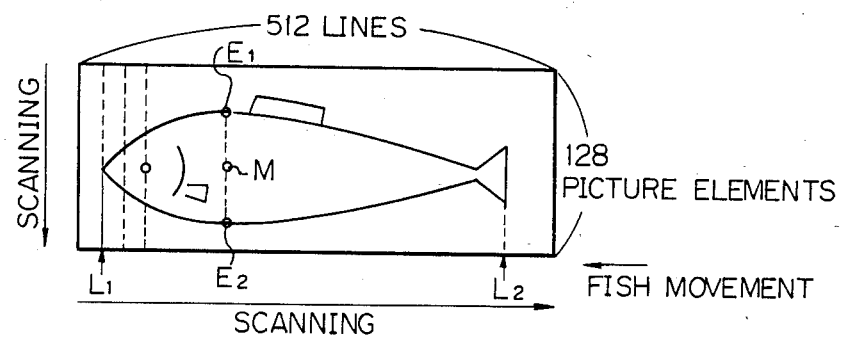
FIG. 3 is a diagram illustrating the scanning operation of the image and the operation of an edge detector shown in FIG. 2.

FIG. 2 illustrates the circuit construction of the recognizing stage 24 in the control unit 20. A multiplexer 70 is electrically connected to the video memories 22a and 22b, shown in FIG. 1, and alternately selects one of the video memories 22a and 22b. Namely, while image information from the image pick-up device 18a is written in the video memory 22a, image information stored in the video memory 22b is read out, and vice versa. The selected image information from the multiplexer 70 is fed to a first median filter 72 for eliminating noise information which has extremely different values from the selected image information. The construction of such a median filter is known. The image information from which the noise component has been eliminated by the first median filter 72 is applied to an edge detector 74 and to a back-belly recognizing circuit 76. The edge detector 74 finds an outline of the image of the fish from the image information. Horizontal scanning of the image of the fish in the transverse direction occurs 512 times. Each line has 128 picture elements. Therefore, the image of one fish is expressed by $128 \times 512$ picture elements. As shown in FIG. 3, the image information corresponding to the 512 lines, each of which lines has 128 picture elements, is stored in the video memory 22a or 22b. The edge detector 74 finds edges $E_1$ and $E_2$ of the image of fish with respect to each line and outputs element (row) addresses of the edges $E_1$ and $E_2$. In order to find the edges $E_1$ and $E_2$, the edge detector 74 detects the difference of values between neighboring image data on the same line. If there is an extremely large difference between values of neighboring image data, an element address corresponding to one of the image data is output as an edge $E_1$ or $E_2$. In general, three successive image data values on the same line are compared. If there is an extremely large difference between the image data values in the two sides, an element address of the center image data is recognized as an edge $E_1$ or $E_2$. The edge detector 74, then, will find the edges with respect to all the lines and output respective element addresses. Such an edge detector is known.

The edge data from the edge detector 74 is fed to a middle point detector 82, a width detector 84, and the back-belly recognizing circuit 76 via second and third median filters 78 and 80. The second and third median filters 78 and 80 eliminate edge data having extra-ordinary values as noise data.

The middle point detector 82 finds the middle point M (See FIG. 3) of a line between the edges $E_1$ and $E_2$. This middle point M can be easily found by calculating the difference between edge data of $E_1$ and $E_2$ with respect to the same line. The middle point M may also be obtained by calculating the average value of the edge data $E_1$ and $E_2$ with respect to the same line. The calculated middle point data is applied to the back-belly recognizing circuit 76.

The back-belly recognizing circuit 76 produces and feeds to a position judging circuit 86 data used for judging a position of fish with respect to the back portion and the belly portion. The width detector 84 produces and feeds to the position judging circuit 86 data used for judging a position of fish with respect to the head portion and the tail portion and for determining the cutting position of the fish head.

In general, a fish being fed in a direction of an arrow 90 by a conveyor 88 can lie on the conveyor 88 in the following four different positions, as shown in FIG. 4:

POSITION A: The tail portion $P_t$ is in the front and the back portion $P_{ba}$ is to the left with respect to the moving direction.

POSITION B: The head portion $P_h$ is in the front and the back portion $P_{ba}$ is to the left with respect to the moving direction.

POSITION C: The tail portion $P_t$ is in the front and the belly portion $P_{be}$ is to the right with respect to the moving direction.

POSITION D: The head portion $P_h$ is in the front and the back portion $P_{ba}$ is to the right with respect to the moving direction.

The data from the back-belly recognizing circuit 76 is used for distinguishing between the positions A and C or between the positions B and D. The data from the width detector 84 is used for distinguishing between the positions A and B or between the positions C and D.

Before describing the back-belly recognizing circuit 76, width detector 84, and position judging circuit 86 in detail, the method for judging the fish position will be mentioned.

Figure 5:
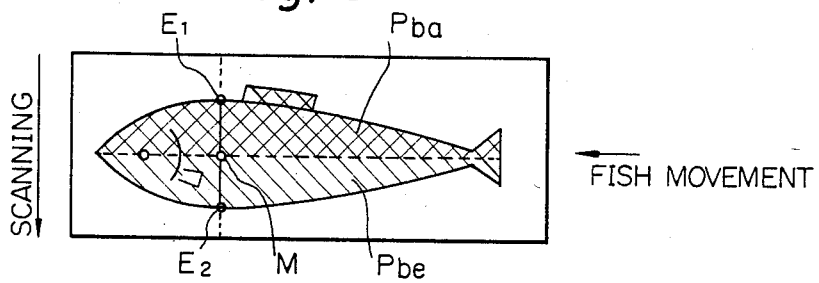
FIG. 5 is a diagram illustrating the operation of a back-belly recognizing circuit shown in FIG. 2.

Distinguishing between of the back and belly portions of the fish is performed by comparing the sum of the value of the image data of each picture element from the edge $E_1$ to the middle point M with the sum of the value of the image data of each picture element from the middle point M to the edge $E_2$, with respect to the same line as shown in FIG. 5. The light density of the back portion $P_{ba}$ of fish is in general higher than that of the belly portion $P_{be}$ of fish. Therefore, the portion whose sum is greater than that of the other portion will be judged as the back portion. The other portion will be judged as the belly portion. If the above comparison is performed with respect to all the lines, a correcter judgement can be obtained.

Figure 6:
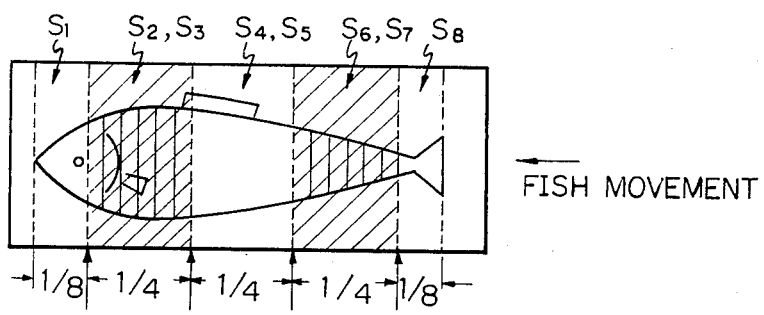
FIG. 6 is a diagram illustrating the operation of a width detector shown in FIG. 2.

Distinction of the head and tail portions of the fish is performed by comparing the sum of the width of the fish body within a predetermined front region with the sum of the width of the fish body within a predetermined rear region. For example, as shown in FIG. 6, the body length of the fish is equally separated to eight sections $S_1$ to $S_8$. The first and eighth sections $S_1$ and $S_8$ are ignored due to the large number of errors from such sections. The second and third sections $S_2$ and $S_3$ are defined as a front region, and the sixth and seventh sections $S_6$ and $S_7$ are defined as a rear region. The sum of the width of the fish body on the scanning lines within the front region is compared with the sum of the width of the fish body on the scanning lines within the rear region. Since the width in the head portion is in general greater than that in the tail portion, the portion whose sum is greater than that of the other portion will be judged as the head portion.

Figure 7:
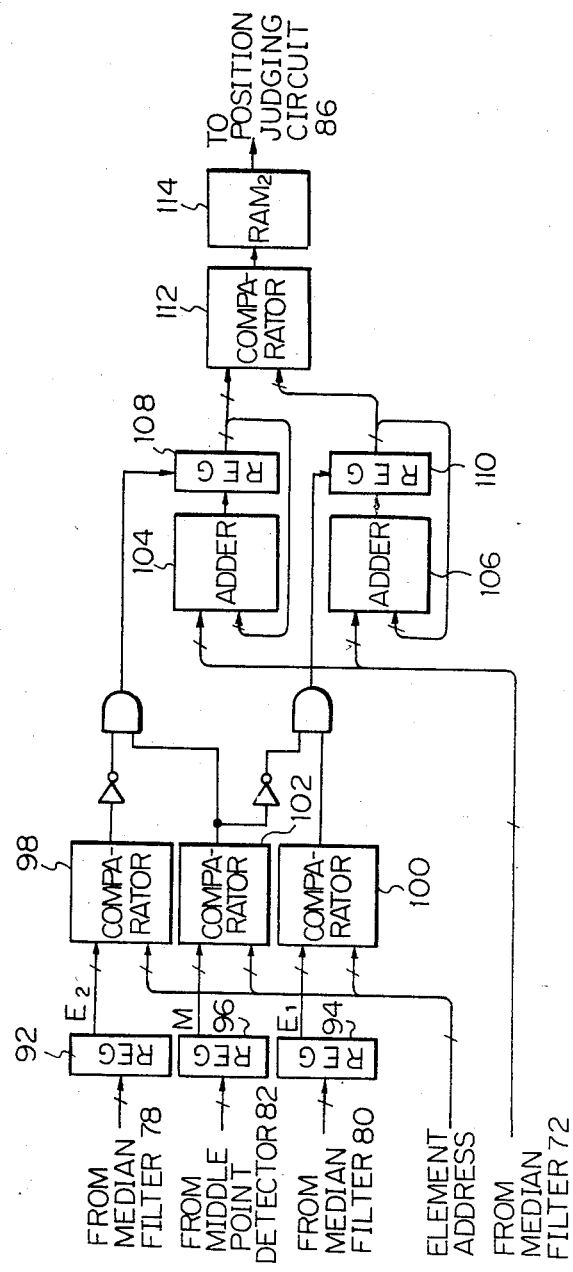
FIG. 7 is a block diagram of the back-belly recognizing circuit shown in FIG. 2.

FIG. 7 illustrates an example of the back-belly recognizing circuit 76 shown in FIG. 2. Edge data from the median filters 78 and 80 (FIG. 2) and middle point data from the middle point detector 82 (FIG. 2) are applied to one input terminal of comparators 92, 94, and 96 via registers 98, 100, and 102, respectively. To the other input terminal of the comparators 92, 94, and 96, an element address which will increase from zero to 127 by scanning is applied. Furthermore, image data indicating the light density of each picture element on the scanned line is applied to adders 104 and 106 from the median filter 72 (FIG. 2). When the element address is between the edge data corresponding to the edge $E_1$ and the middle point data corresponding to M, only the comparator 100 outputs an "H" level signal. The other comparators 98 and 102 output an "L" level signal. This causes a register 110 to enable and a register 108 to disenable. Thus, the values of the image data between the edge $E_1$ and the middle point M on the scanned line are summed by the adder 106. On the other hand, when the element address is between the middle point data corresponding to M and the edge data corresponding to the edge $E_2$, only the comparator 102 outputs an "H" level signal. The remaining comparators 98 and 100 output an "L" level signal. This causes the register 108 to enable and the register 110 to disenable. Therefore, the values of the image data between the middle point M and the edge $E_2$ on the scanned line are summed by the adder 104. After scanning one line, therefore, the sum of the light density of picture elements in the right side ($E_1$ to M) of the fish with respect to the moving direction is obtained from the register 110, and the sum of the density of picture elements in the left side (M to $E_2$) with respect to the moving direction is obtained from the register 108. The obtained sums are compared by a comparator 112 to produce a one-bit data of "1" or "0" indicating which portion of the scanned line has a higher density than the other. The one-bit data is stored in a second random access memory (RAM) 114. In a similar manner, one-bit data with respect to all the lines (512 lines) are produced and stored in the RAM 114.

Figure 8:
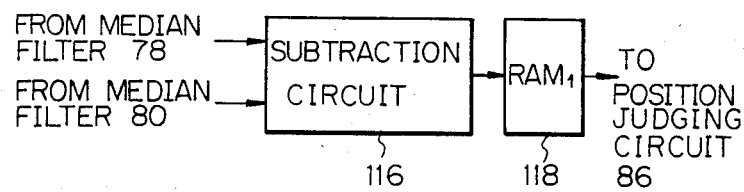
FIG. 8 is a block diagram of the width detector shown in FIG. 2.

FIG. 8 illustrates an example of the width detector 84 shown in FIG. 2. Edge data from the median filters 78 and 80 (FIG. 2) is applied to a subtraction circuit 116. The subtraction circuit 116 calculates the difference between the edge data corresponding to the edges $E_1$ and $E_2$ and produces width data which indicates the width of the fish on the scanned line. The width data is stored in a first random access memory (RAM₁) 118. In a similar manner, width data with respect to all the lines (512 lines) are produced and stored in the RAM₁ 116.

The above-mentioned operations of the back-belly recognizing circuit 76 and the width detector 84 are carried out in parallel. The image information from the video memorys 22a or 22b is sequentially fed to the back-belly recognizing circuit 76 and the width detector 84 so as to enable pipeline processing. Namely, the above one-bit data, and the above width data can be obtained for every scan of a line. Accordingly, the position of four fish can be recognized in one second.

Figure 9:
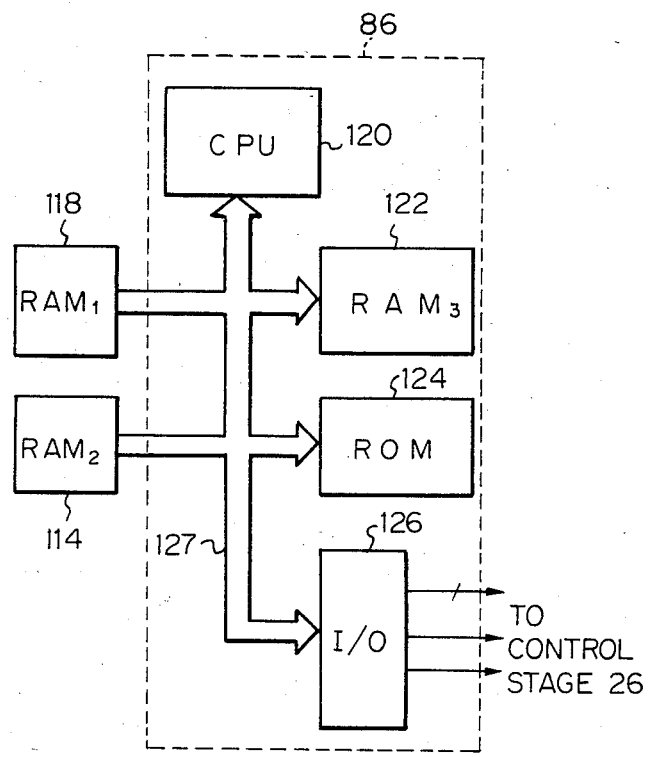
FIG. 9 is a block diagram of a position judging circuit shown in FIG. 2.

FIG. 9 illustrates an example of the position judging circuit 86 shown in FIG. 2. In this example, the position judging circuit 86 comprises a microcomputer including a central processing unit (CPU) 120, a third random access memory (RAM₃) 122, a read only memory (ROM) 124, an input/output (I/O) interface 126, and a bus 127 connecting CPU 120, RAM₃ 122, ROM 124, and I/O interface 126. The bus 127 is also connected to the RAM₁ 118 in the back-belly recognizing circuit 76 and the RAM₂ 114 in the width detector 84 (FIG. 2) so that the CPU 120 can directly access the RAM₁ 118 and RAM₂ 114. The I/O interface 126 is connected to the control stage 26 in the control unit 20 (FIG. 1). In the ROM 124, a control program as shown in FIGS. 10a to 10c is preliminarily stored.

Figure 10A:
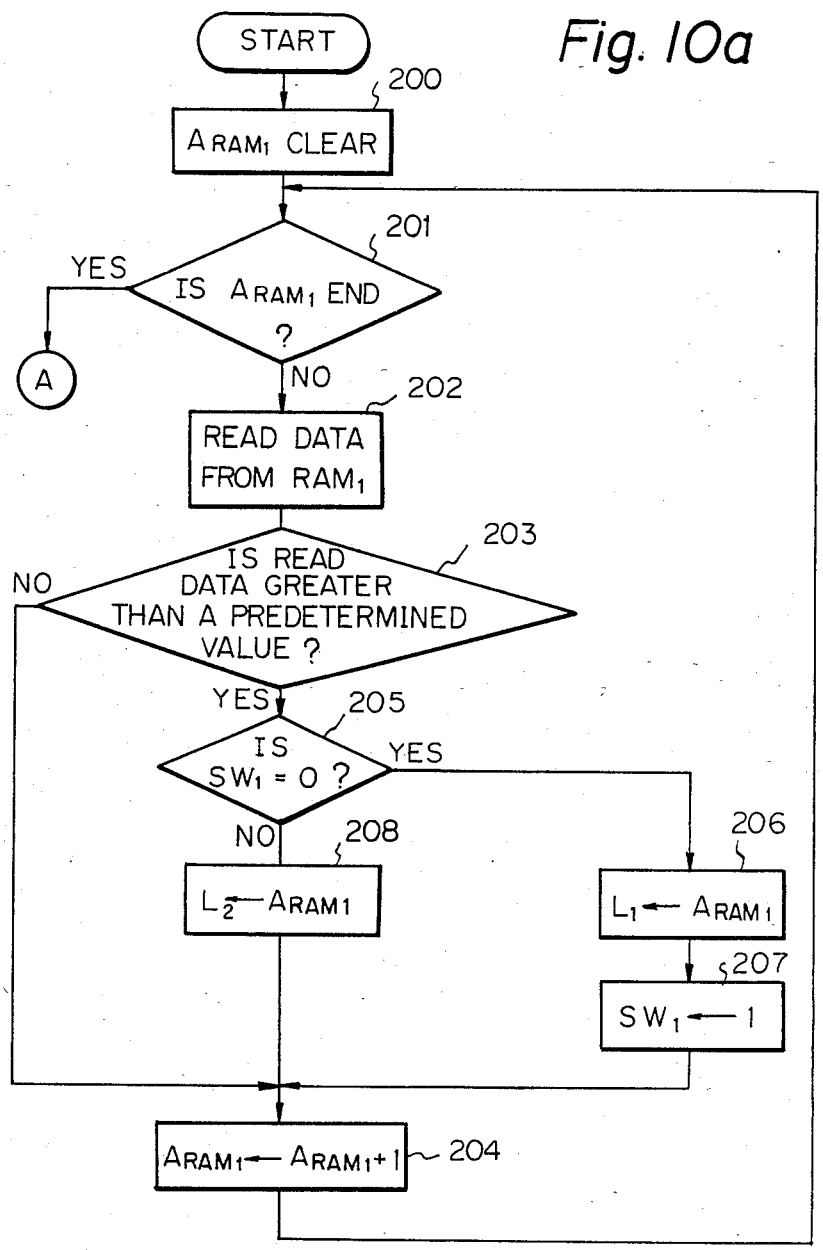
FIGS. 10a, 10b, and 10c are flow diagrams of a control program of the position judging circuit shown in FIG. 2.
Figure 10B:
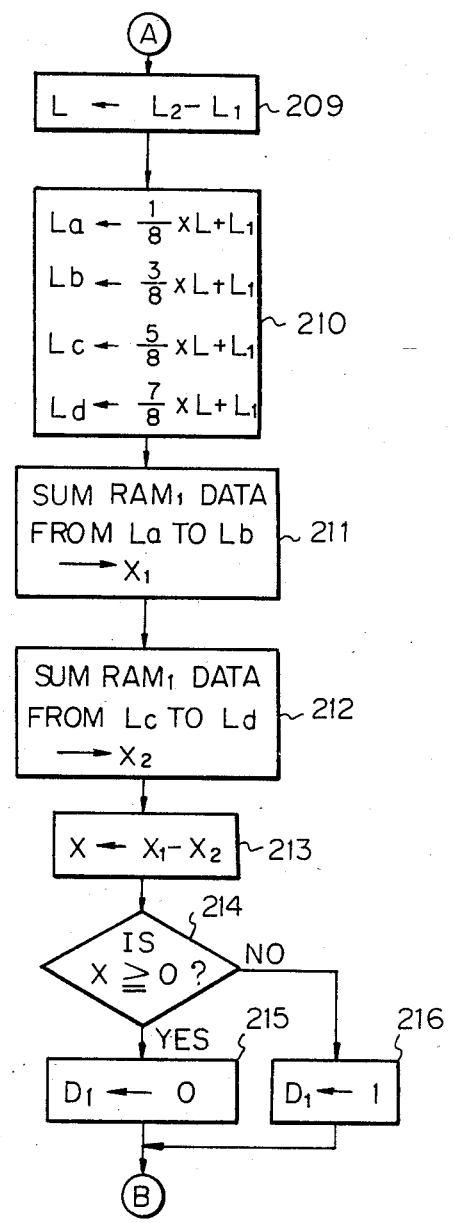
Figure 10C:
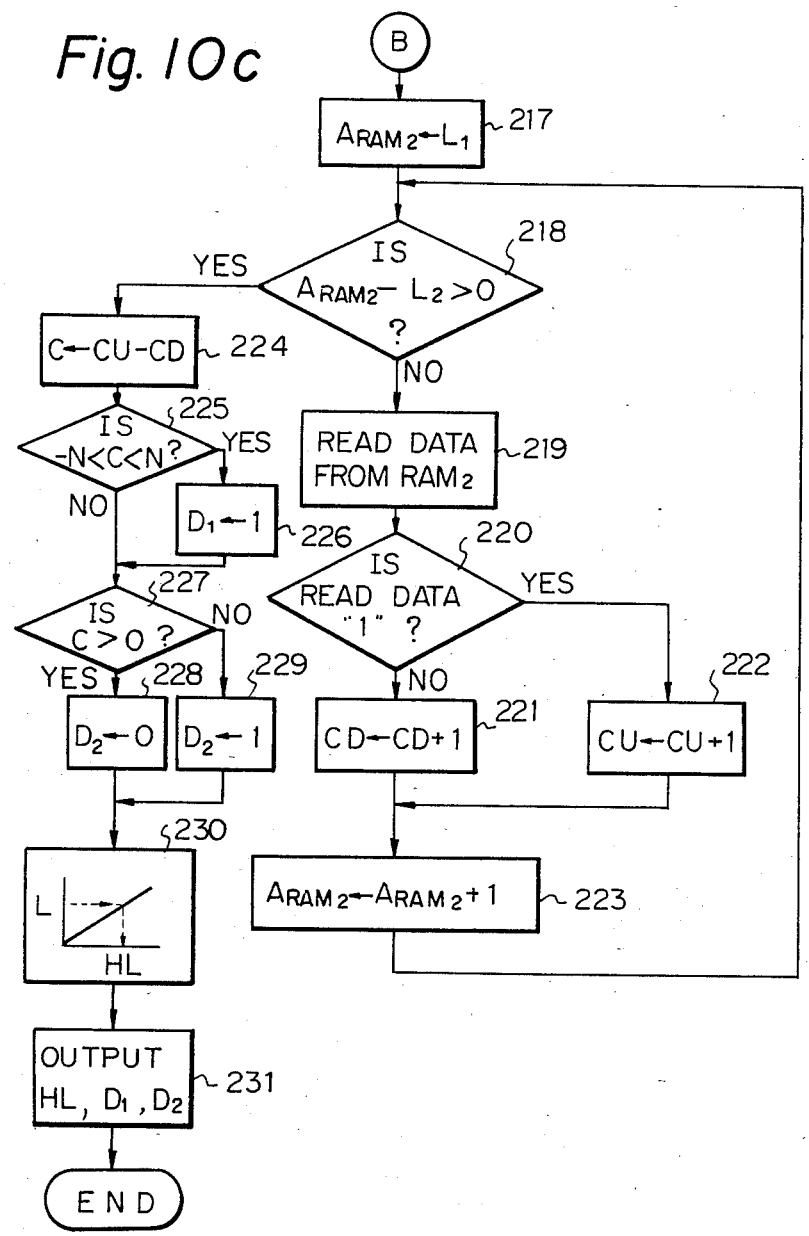

The CPU 120 executes the following routine as shown in FIGS. 10a–10c after each time all the lines are scanned. First, at a point 200, address $A_{RAM1}$ for accessing the RAM₁ 118 is cleared (to zero). At a point 201, it is judged whether the address $A_{RAM1}$ is "end" (511). If not, the program proceeds to a point 202 where width data at the address $A_{RAM1}$ is read out from the RAM₁ 118. At a point 203, it is judged whether the width data read out from the RAM₁ 118 is greater than a predetermined value. If not, since the image of the fish has not yet appeared, the program jumps to a point 204, where the address $A_{RAM1}$ is increased by one, namely $A_{RAM1} \leftarrow A_{RAM1}+1$. Then, the program returns to the point 201. At the point 203, if the width data is greater than the predetermined value, it is judged that there is the image of the fish in that line, and thus the program proceeds to a point 205. At the point 205, it is judged whether a flag SW₁ is "0". Since the flag SW₁ is cleared to "0" during initializing, the first time the program proceeds to the point 205 it will proceed to a point 206. At the point 206, L₁ is set to the address $A_{RAM1}$ at that time. Then, at a point 207, the flag SW₁ is set to "1". Thereafter, the program proceeds to the point 204. It should be noted that the address $A_{RAM1}$ corresponds to a line address. Therefore, the above L₁ indicates a front edge position of the image of fish as shown in FIG. 3. At the point 205, if the flag SW₁ is "1", the program proceeds to a point 208 where L₂ is set to the address $A_{RAM1}$ at that time. Then, the program proceeds to the point 204. The step at the point 208 is repeatedly executed until the width data becomes smaller than the predetermined value, namely until the image of the fish disappears. Therefore, the final value of L₂ indicates a rear edge position of the image of the fish as shown in FIG. 3.

If the address $A_{RAM1}$ is "end", the program proceeds to a point 209 shown in FIG. 10b. At the point 209, the difference L between L₂ and L₁ is calculated from $L=L_2-L_1$. This difference L corresponds to the total length of the fish. Then, at a point 210, boundary addresses $L_a$ between the sections S₁ and S₂, $L_b$ between the sections S₃ and S₄, $L_c$ between the sections S₅ and S₆, and $L_d$ between the sections S₇ and S₈ shown in FIG. 6 are calculated from At a point 211, the width data stored in the RAM₁ 118 from the addresses $L_a$ to $L_b$ are summed to obtain a summed value X₁. At a point 212, the width data stored in the RAM₁ 118 from the addresses $L_c$ to $L_d$ are summed to obtain a summed value X₂. Then, at points 213 and 214, the summed values X₁ and X₂ are compared with each other. If $X_1 \geq X_2$, the program proceeds to a point 215 where a first drive signal D₁ for driving the actuator 28 is reset to "0". In this case, since the sum X₁ of the front region is greater than (or equal to) the sum X₂ of the rear region, the head portion of the fish is in the front. In other words, the fish position is in the position B or D shown in FIG. 4. If $X_1 < X_2$, the program proceeds to a point 216 where the first drive signal D₁ is set to "1". In this case, the tail portion of the fish is in the front, namely, the fish position is in the position A or C shown in FIG. 4.

At a point 217 shown in FIG. 10c, address $A_{RAM2}$ for accessing the RAM₂ 114 is set to L₁, corresponding to the front edge of the image of fish. Then, at a point 218, it is judged whether the address $A_{RAM2}$ exceeds L₂, corresponding to the rear edge of the image of the fish. If not, the program proceeds to a point 219, where one-bit data at the address $A_{RAM2}$ is read out from the RAM₂ 114. At a point 220, it is judged whether the one-bit data read out from the RAM₂ 114 is "1". If it is not "1", a counter CD is increased by one at a point 221, namely CD←CD+1. If the one-bit data is "1", a counter CU is increased by one at a point 222, namely, CU←CU+1. Then, the program proceeds to a point 223, where the address $A_{RAM2}$ is increased by one, namely $A_{RAM2} \leftarrow A_{RAM2}+1$. The above processing is repeatedly executed until the address $A_{RAM2}$ exceeds L₂.

If the address $A_{RAM2}$ increases greater than L₂, the program proceeds to a point 224, where the difference C between the counters CU and CD is calculated from $C=CU-CD$. Then, at a point 225, it is judged whether the difference between CU and CD is smaller than a predetermined value N. If $-N<C<N$, the program proceeds to a point 226, where the first drive signal D₁ is set to "1". In this case, the difference in light density between the back and belly portions is very small. Thus, it is difficult to judge the fish position.

If the difference between CU and CD is not smaller than N, the program proceeds to a point 227, where whether the difference C is greater than zero is judged. Namely, at the point 227, it is judged whether CU is greater than CD. If $CU>CD$ ($C>0$), the program proceeds to a point 228, where a second drive signal D₂ is reset to "0". In this case, since the number of the one-bit data which indicate the right side of the scanned line with respect to the moving direction has a higher light density than the left side is greater than the other one-bit data, it is judged that the back portion of the fish faces the right side with respect to the moving direction. Namely, the fish position is in the position C or D shown in FIG. 4. If $CU<CD$ ($C<0$), the program proceeds to a point 229, where the second drive signal D₂ is set to "1". In this case, the back portion of the fish faces the left side with respect to the moving direction. In other words, the fish position is in the position A or B shown in FIG. 4.

Figure 11:
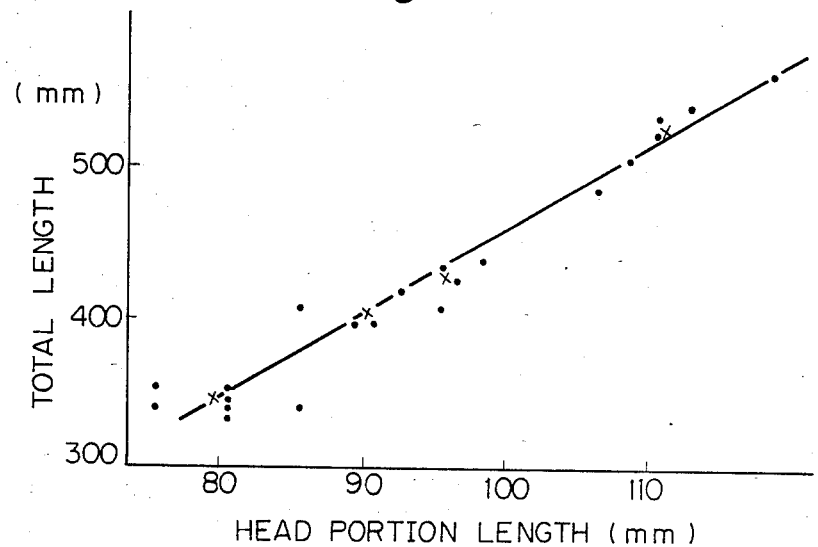
FIG. 11 is a graph illustrating a relationship between total fish length and head portion length.

Then, at a point 230, the length of the head portion HL is found as a function of the total length L. There is a close relationship between the total length L of fish and the head portion length HL of fish, as shown in FIG. 11. At the point 230, the head portion length HL corresponding to the calculated total length L is found from the function table indicating the relationship shown in FIG. 11. As will be apparent, the head portion length HL indicates the cutting position of fish heads. At a final point 231, a signal indicating the head portion length HL and the first and second drive signals $D_1$ and $D_2$ are output to the I/O interface 126.

Figure 12:
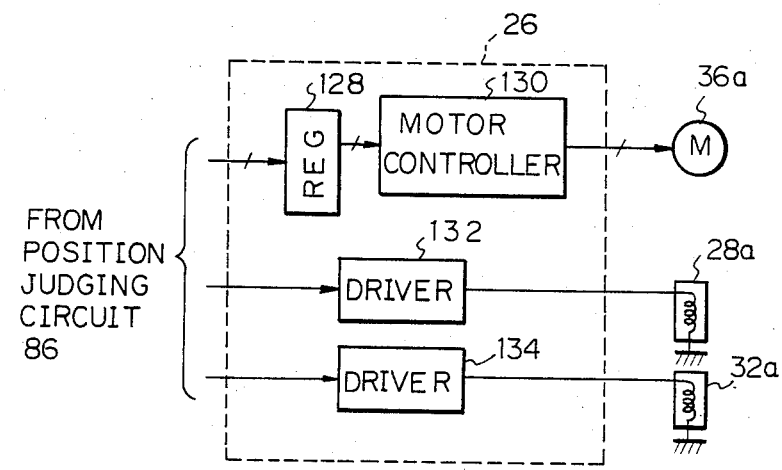
FIG. 12 is a block diagram of a control stage shown in FIG. 1.

FIG. 12 illustrates an example of the control stage 26 in the control unit 20 shown in FIG. 1. The head portion length signal HL is applied to a motor controller 130 via a register 128. The motor controller 130 produces drive signals for driving the stepper motor or servo motor 36a in the actuator 36, in accordance with the head portion length signal HL. Thus, the movable part 60a of the guide board 60 (FIG. 1) moves in the directions of the arrow 62 so as to adjust the cutting position of the fish head to a position which corresponds to the head portion length HL. As a result, fish heads can be always cut off at an optimum position irrespective of the size of the fish.

The first and second drive signals $D_1$ and $D_2$ are applied to drivers 132 and 134, respectively. If the first drive signal $D_1$ is "0", the driver 132 will not feed drive current to a solenoid 28a in the actuator 28 (FIG. 1), causing the first selection gate 30 to hold at a position as shown in FIG. 1. Namely, the exit 42 is closed and the fish will be fed to the second selection gate 34. Contrary to this, if the first drive signal $D_1$ is "1", the driver 132 will feed drive current to the solenoid 28a, causing the first selection gate 30 to close the passage to the second selection gate 34 and to open the exit 42. Therefore, the fish will be ejected from the exit 42. If the fish is at the position A or C shown in FIG. 4, namely if the tail portion of the fish is in the front, the fish is ejected. Furthermore, if judgement of the back and belly portions of the fish is difficult because of poor difference in light density therebetween, the fish is ejected.

If the second drive signal $D_2$ is "0", the driver 134 will not feed drive current to a solenoid 32a in the actuator 32 (FIG. 1), causing the second selection gate 34 to hold at a position as shown in FIG. 1. Namely the first branch passage 46 is open and the second branch passage 50 is closed, causing the fish position to invert between the back and belly portions. If the second drive signal $D_2$ is "1", the driver 34 will feed drive current to the solenoid 32a, causing the second selection gate 34 to close the first branch passage 46 and to open the second branch passage 50. Therefore, the fish position is not inverted.

As a result, all fish to be fed to the buffer conveyor 52 are always at the position B shown in FIG. 4, namely the head portions are in the front and the back portions are to the left with respect to the moving direction.

Many widely different embodiments of the present invention may be constructed without departing from the spirit and scope of the present invention. It should be understood that the present invention is not limited to the specific embodiments described in this specification, except as defined in the appended claims.

We claim:

1. A fish processing apparatus having head cutter means for cutting off a head portion of a fish, comprising:

means for optically scanning of the whole body of the fish;

means, operatively connected to said optical scanning means, for producing image information of the fish in accordance with said optical scanning;

means, operatively connected to said image producing means, for determining a cutting position of the head portion of the fish in accordance with a shape of the fish represented by said image information, and means, operatively connected to said determining means, for adjusting the relative position of the fish with respect to said head cutter means in accordance with said determined cutting position.

2. An apparatus as claimed in claim 1, wherein the fish has a total length and the head portion has a head portion length and said cutting position determining means includes:

means, operatively connected to said image producing means, for determining the total length of the fish in accordance with said image information; and means, operatively connected to said total length determining means, for finding the head portion length of the fish in accordance with said total length of the fish in accordance with a preestablished relationship between the total length of a fish and a head portion length of a fish.

3. An apparatus as claimed in claim 2, wherein the image information of the fish has a tail portion, and a plurality of widths at various points longitudinally spaced along the length of the fish, and said total length determining means includes:

edge detector means, operatively connected to said image producing means, for finding an outline of the image of the fish from said produced image information;

width detector means, operatively connected to said edge detector means, for calculating the width of the image of the fish at a plurality of points longitudinally spaced along the length of the fish; and means, operatively connected to said width detector means, for finding the total length of the fish in accordance with said calculated widths of the image of the fish.

4. An apparatus as claimed in claim 1, wherein said image producing means includes at least one image pick-up device for forming the image of the fish and for scanning the image to produce the image information and wherein said determining means includes at least one memory for storing said image information produced by said image producing means.

5. An apparatus as claimed in claim 1, wherein said adjusting means includes an actuator means for moving the fish position with respect to said head cutter means, in accordance with said determined cutting position.

6. A fish processing apparatus having head cutter means for cutting off a head portion of a fish, comprising:

means for producing image information of the fish;

means, operatively connected to said image producing means, for determining a cutting position of the head portion of the fish in accordance with said image information;

means, operatively connected to said image producing means, for determining the relative position of the fish in accordance with said image information;

means, operatively connected to said relative position finding means, for arranging the fish in a predetermined position depending upon said position found by said position finding means; and means, operatively connected to said cutting position determining means, for adjusting the relative position of the arranged fish with respect to said head cutter means in accordance with said determined cutting position.

7. An apparatus as claimed in claim 6, wherein said relative position determining means includes:
first position detector means, operatively connected to said image producing means, for finding the head portion and a tail portion of the fish in accordance with said image information; and
second position detector means, operatively connected to said image producing means, for finding a back portion and a belly portion of the fish in accordance with said image information.

8. An apparatus as claimed in claim 7, wherein said image information of the fish has a plurality of widths at various points longitudinally spaced along the length of the fish and a front and a rear region and said first position detector means includes:
edge detector means, operatively connected to said image producing means, for finding an outline of the image of the fish from said image information;
width detector means, operatively connected to said edge detector means, for calculating the width of the image of the fish at a plurality of points longitudinally spaced along said length of said image of said fish, in accordance with said outline of the image information;
means, operatively connected to said width detector means, for comparing at least one of said calculated widths in the front region of the image with at least one of said calculated widths in the rear region of the image.

9. An apparatus as claimed in claim 7, wherein said image information of the fish has a longitudinal middle line and said second position detector means includes means for comparing the light density of the image information for a left side of the image information of the fish with respect to the middle line of the image information with the light density of the image information for a right side of the image information of the fish with respect to the middle line of the image information.

10. An apparatus as claimed in claim 9, wherein said density comparing means includes:
edge detector means, operatively connected to said image producing means, for finding an outline of the image of the fish from said produced image information; and
middle point detector means, operatively connected to said edge detector means, for finding a longitudinal middle line in accordance with said found outline; and
means for comparing the light density of the image information for a left side of the fish with respect to said found middle line with the light density of the image information for a right side of the fish with respect to said found middle line.

11. An apparatus as claimed in claim 6, wherein said arranging means includes:
means, operatively connected to said relative position determining means, for inverting the position of the fish with respect to the back portion and the belly portion in accordance with said relative fish position and
means, operatively connected to said relative position determining means, for ejecting the fish from the fish processing apparatus in accordance with said relative fish position.

12. An apparatus as claimed in claim 7, wherein said arranging means includes:
means, operatively connected to said second position detecting means, for inverting the position of the fish with respect to the back portion and the belly portion in accordance with said second position found by said second position detector means and
means, operatively connected to said first position detecting means, for ejecting the fish from the fish processing apparatus in accordance with said first position found by said first position detector means.

13. An apparatus as claimed in claim 6, wherein the fish has a total length and the head portion has a head portion length and said cutting position determining means includes;
means, operatively connected to said image producing means, for determining the total length of the fish in accordance with said image information; and
means, operatively connected to said total length determining means, for determining the head portion length of the fish in accordance with said total length of a fish and a head portion length of a fish.

14. An apparatus as claimed in claim 13, wherein said image information of the fish has a plurality of widths at various points longitudinally spaced along the length of the fish, said total length finding means includes:
edge detector means, operatively connected to said image producing means, for finding an outline of the image of the fish from said image information;
width detector means, operatively connected to said image producing means, for calculating the width of the image of the fish at a plurality of points longitudinally spaced along the length of the fish; and
means, operatively connected to said width detector means, for finding the total length of the fish in accordance with said calculated width of the image of the fish.

15. An apparatus as claimed in claim 12, wherein the fish has a total length and the head portion has a head portion length and said cutting position determining means includes:
means, operatively connected to said image producing means, for determining the total length of the fish in accordance with said image information; and
means, operatively connected to said total length determining means, for determining the head portion length of the fish in accordance with said total length of the fish and a determined relationship between the total length of a fish and a head portion length of a fish.

16. An apparatus as claimed in claim 15, wherein said total length finding means includes:
edge detector means, operatively connected to said image producing means, for finding an outline of the image of the fish from said image information;
width detector means, operatively connected to said edge detector means, for calculating the width of the image of the fish at a plurality of points longitudinally spaced along the length of the fish; and
means, operatively connected to said width detector means, for finding the total length of the fish in accordance with said calculated width of the image of the fish.

* * * * *

UNITED STATES PATENT AND TRADEMARK OFFICE
CERTIFICATE OF CORRECTION

PATENT NO. : 4,601,083
DATED : July 22, 1986
INVENTOR(S) : Shoji et al.

It is certified that error appears in the above-identified patent and that said Letters Patent is hereby corrected as shown below:

Col. 1, line 63, after "of" insert --the--.

Col. 2, line 51, after "conveyor" insert --for feeding fish from--.

line 52, delete "for feeding fish"; after "hopper" insert --11 to--.

Col. 5, line 57, delete "of".

Col. 7, line 7, "memorys" should be --memories--.

UNITED STATES PATENT AND TRADEMARK OFFICE
CERTIFICATE OF CORRECTION

PATENT NO. : 4,601,083
DATED : July 22, 1986
INVENTOR(S) : Shoji et al.

PAGE 2 of 2

It is certified that error appears in the above-identified patent and that said Letters Patent is hereby corrected as shown below:

Col. 8, line 2, after "from" insert $$-- L_a = \frac{1}{8} \times L + L_1, L_b = \frac{3}{8} \times L + L_1,$$
$$L_c = \frac{5}{8} \times L + L_1, \text{ and } L_d = \frac{7}{8} \times L + L_1. --.$$

line 5, delete "stored".

Col. 12, line 9, after "means" insert --;--.

Signed and Sealed this
Second Day of December, 1986

Attest:

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO. : 4,601,083

DATED : July 22, 1986

INVENTOR(S) : Toyoshige Shoji and Tatsuo Miyakawa

It is certified that error appears in the above-identified patent and that said Letters Patent is hereby corrected as shown below:

On the Title Page:

[73]    -- Taiyo Fishery Co. Ltd., Tokyo, Japan and Fujitsu Limited, Kanagawa, Japan --.

Signed and Sealed this

Twenty-fifth Day of August, 1987

Attest:

DONALD J. QUIGG

Attesting Officer    Commissioner of Patents and Trademarks

UNITED STATES PATENT AND TRADEMARK OFFICE
CERTIFICATE OF CORRECTION

PATENT NO. : 4,601,083
DATED : July 22, 1986
INVENTOR(S) : Toyoshige Shoji and Tatsuo Miyakawa It is certified that error appears in the above-identified patent and that said Letters Patent is hereby corrected as shown below:

On the title page, item [73] should read as follows:

--Assignee: Taiyo Fishery Co. Ltd., Tokyo, Japan

Fujitsu Limited, Kawasaki, Japan --.

This certificate supersedes Certificate of Correction issued August 25, 1987.

Signed and Sealed this

Twenty-second Day of September, 1987

*Attest:*

DONALD J. QUIGG

*Attesting Officer*   Commissioner of Patents and Trademarks